United States Patent
Kagawa et al.

[11] Patent Number: 5,911,028
[45] Date of Patent: Jun. 8, 1999

[54] VIDEO SIGNAL AND CAMERA SIGNAL PROCESSING APPARATUS

[75] Inventors: Takashi Kagawa, Kanagawa; Takao Yoshikawa, Chiba; Takuro Enomoto, Saitama, all of Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/583,551

[22] Filed: Jan. 5, 1996

[30] Foreign Application Priority Data

Jan. 10, 1995 [JP] Japan .................................... 7-017409

[51] Int. Cl.$^6$ ........................................................ H04N 5/94
[52] U.S. Cl. .................................................. 386/2; 386/38
[58] Field of Search .............................. 386/2, 3, 46, 47, 386/49, 117, 25–38; 358/906, 909.1; H04N 5/76, 5/77, 5/94

[56] References Cited

U.S. PATENT DOCUMENTS

| | | | |
|---|---|---|---|
| 4,628,369 | 12/1986 | Ichinoi et al. | 386/3 |
| 4,695,877 | 9/1987 | Matsumoto | 386/25 |
| 4,961,108 | 10/1990 | Perlman | 386/25 |
| 5,134,487 | 7/1992 | Taguchi et al. | 358/909.1 |
| 5,142,375 | 8/1992 | Fukuda et al. | |
| 5,572,254 | 11/1996 | Kawahara | 358/906 |

OTHER PUBLICATIONS

"New Signal–Processing LSIs for the 8mm Camcorder", Onga et al., IEEE Transactions on Consumer Electronics, Vo. 36, No. 3, Aug. 1990, New York, pp. 494–501.

*Primary Examiner*—Thai Tran
*Assistant Examiner*—Huy Nguyen
*Attorney, Agent, or Firm*—Frommer, Lawrence & Haug, LLP.; William S. Frommer

[57] ABSTRACT

In the VTR reproduction mode, since a signal of which a luminance signal and a chroma signal that have been band-limited are combined is supplied to a Y comb filter and a C comb filter, the process can be performed with only one A/D converter. In addition, an A/D converter and 2H line delay circuits for processing camera signals can be commonly used in the VTR reproduction mode.

10 Claims, 2 Drawing Sheets

VIDEO SIGNAL AND CAMERA SIGNAL PROCESSING APPARATUS

BACKGROUND OF THE INVENTION

1. Field of the Invention

The present invention relates to a video signal processing circuit suitable for a Y comb filter and a C comb filter for removing cross-talk in a reproduction system of a camcorder.

2. Description of the Related Art

The reproduction system of a conventional VTR is provided with a Y comb filter and a C comb filter for removing cross-talk. The Y comb filter and the C comb filter are conventionally composed of analog circuits. However, an attempt for composing the Y comb filter and the C comb filter with digital circuits has been made.

However, when the conventional analog Y comb filter and C comb filter are composed of digital circuits, two A/D converters for use with a luminance signal and a chroma signal are required. In addition, a one-line delay circuit for the Y comb filter and another one-line delay circuit for the C comb filter are required. Thus, the circuit scale adversely increases.

Particularly, in the case of a small camcorder that digitally processes signals is known, it is important to reduce the circuit scale and the fabrication cost. The camcorder that digitally processes camera signals has an A/D converter that converts a photographed image signal into a digital signal. When the camcorder, which is small and digitally processes signals, has a digital Y comb filter and a C comb filter, A/D converters and one-line delay circuits for the comb filters are required. Thus, the circuit scale increases and the fabrication cost rises.

OBJECTS AND SUMMARY OF THE INVENTION

Therefore, an object of the present invention is to provide a video signal processing circuit having a digital Y comb filter and a digital C comb filter that do not require an increase of the circuit scale.

The present invention is a video signal processing apparatus, comprising an input selecting circuit for selectively inputting a video signal of which a component of a luminance signal and a component of a chroma signal are combined or a photographed image signal photographed by a image pickup device, an A/D converter for digitizing the selected signal selected by the input selecting circuit from the video signal of which the component of the luminance signal and the component of the chroma signal are combined or the image signal photographed by the image pick-up device, a plurality of line delay circuits connected in series and adapted for delaying an output signal of the A/D converter, a luminance signal comb filter, a chroma signal comb filter, and a camera signal processing circuit for receiving output signals from middle portions of the line delay circuits connected in series, and an output selecting circuit for selecting an output signal of the luminance signal comb filter and the chroma signal comb filter and an output signal of the camera signal processing circuit.

In the VTR reproduction mode, since a signal of which a luminance signal and a chroma sinal that have been band-limited are combined is supplied to a Y comb filter and a C comb filter, the process can be performed with only one A/D converter. In addition, since the A/D converter and the 2H line delay circuits that process the camera signals are used in common with those for the Y comb filter and the C comb filter, it is almost not necessary to newly add circuits.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

Figure 1:
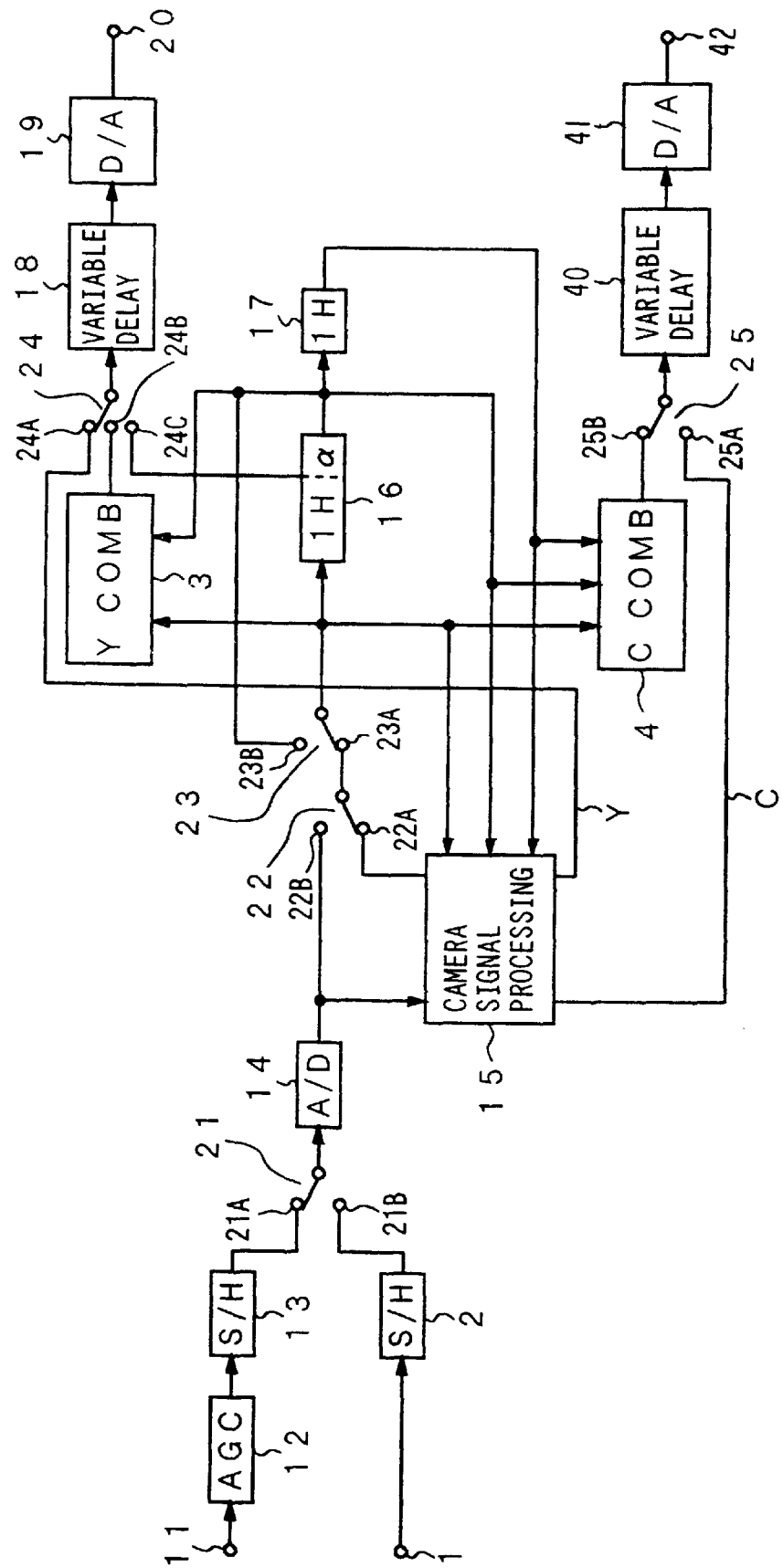
FIG. 1 is a block diagram showing an embodiment of the present invention.

Next, with reference to the accompanying drawings, an embodiment of the present invention will be described. This embodiment is applied for an 8-mm standard camcorder. In FIG. 1, reference numeral 1 is an input terminal for a reproducing VTR signal. Reference numeral 11 is an input terminal for a camera signal.

Figure 2:
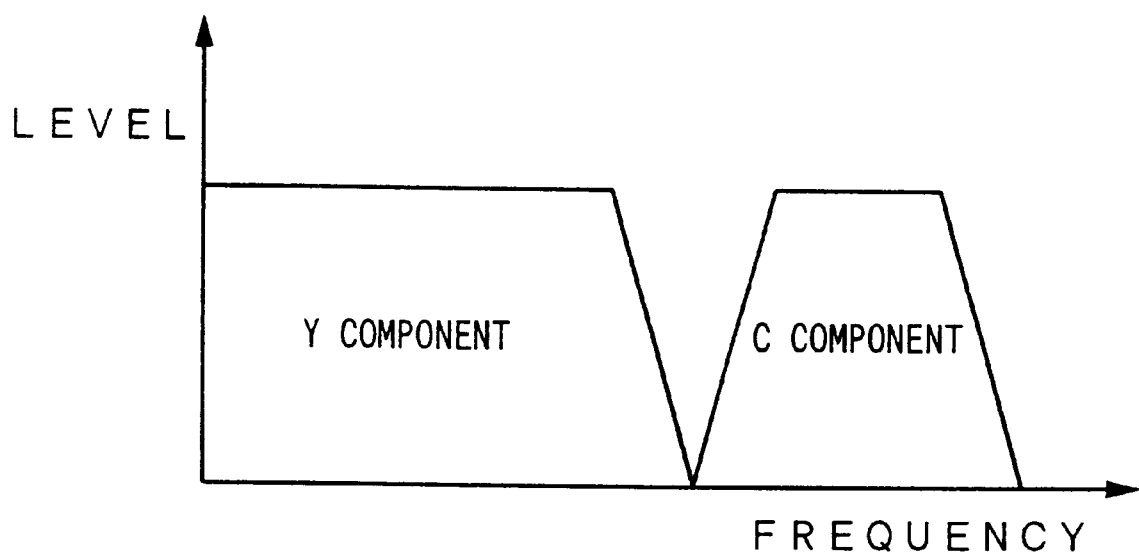
FIG. 2 is a schematic diagram showing a frequency spectrum for explaining the embodiment of the present invention.

In a VTR reproduction mode, a reproduction video signal of which a luminance signal and a chroma signal including a cross-talk component are combined is supplied to the input terminal 1. In other words, as shown in FIG. 2, the luminance signal Y and the chroma signal C are band-limited and a component of the luminance signal Y and a component of the chroma signal C are combined in such a manner that they can be separated on frequencies. The resultant signal is supplied to the input terminal 1. A photographed image signal photographed by a CCD image pick-up device is supplied to the input terminal 11.

Reference numerals 21 to 25 are switch circuits switched over depending on the selected mode is the camera signal input mode and the VTR reproduction mode. In the camera signal input mode, the switch circuit 21 is placed in a terminal 21A position. On the other hand, in the VTR reproduction mode, the switch circuit 21 is placed in a terminal 21B position. In the camera signal input mode, the switch circuit 23 is placed in a terminal 23A position. Likewise, in the normal VTR reproduction mode, the switch circuit 23 is placed in the terminal 23A position. However, in the case that a drop-out takes place in the 8-mm standard mode (referred to as normal mode) in which the band of the luminance signal is limited to 3 MHz or less, the switch circuit 23 is placed in a terminal 23B position. In the camera signal input mode, the switch circuit 24 is placed in a terminal 24A position. On the other hand, in the normal VTR reproduction mode, the switch circuit 24 is placed in a terminal 24B position. However, in the case that a drop-out takes place in a mode of which the band of the luminance signal is 5 MHz or greater (referred to as Hi 8 mode), the switch circuit 24 is placed in a terminal 43C position. In the camera signal input mode, the switch circuit 25 is placed in a terminal 25A position. On the other hand, in the VTR reproduction mode, the switch circuit 25 is placed in a terminal 25B position.

In the camera signal input mode, the operation of the VTR reproducing portion is not required. Thus, in this mode, the clock and signals are not supplied to the portions that perform the VTR reproducing operation. On the other hand, in the VTR reproduction mode, since the operation of the camera signal processing portion is not required, the clock and signals are not supplied to the portions that perform the camera signal processing operation. Thus, the power can be prevented from unnecessarily increasing.

First, the camera signal input mode will be described. In the camera signal input mode, a photographed image signal is supplied from the CCD image pick-up device to the input terminal 11. The photographed image signal received from the input terminal 11 is supplied to the terminal 21A of the switch circuit 21 through an AGC circuit 12 and a sample hold circuit 13. In the camera signal input mode, the switch circuit 21 is placed in the terminal 21A position. Thus, an output signal of the sample hold circuit 13 is supplied to an A/D converter 14 through the switch circuit 21. The A/D converter 14 digitizes the photographed image signal.

An output signal of the A/D converter 14 is supplied to a camera signal processing circuit 15 and the terminal 22B of the switch circuit 22. An output signal of the camera signal processing circuit 15 is supplied to the terminal 22A of the switch circuit 22. In the camera signal input mode, the switch circuit 22 is placed in the terminal 22A position. In addition, the switch circuit 23 is placed in the terminal 23A position. Thus, the output signal of the A/D converter 14 is pre-processed by the camera signal processing circuit 15 and supplied to the connection portion of a one-line delay circuit 16 and a one-line delay circuit 17 through the switch circuit 22 and the switch circuit 23. An output signal of the switch circuit 23, an output signal of the connection portion of the one-line delay circuit 16 and the one-line delay circuit 17, and an output signal of the one-line delay circuit 17 are supplied as signals of successive three lines to the camera signal processing circuit 15.

The camera signal processing circuit 15 generates a luminance signal Y and a chroma signal C corresponding to the three successive lines of the photographed image signal. Camera signal processes such as a gamma compensating process and an aperture compensating process are performed for the generated luminance signal Y and chroma signal C. The resultant luminance signal Y is supplied to the terminal 24A of the switch circuit 24. The resultant chroma signal C is supplied to the terminal 25A of the switch circuit 25.

In the camera signal input mode, the switch circuit 24 is placed in the terminal 24A position. Thus, the luminance signal received from the camera signal processing circuit 15 is supplied to a variable delay circuit 18 through the switch circuit 24. The variable delay circuit 18 is disposed in the camera signal processing circuit 15. An output signal of the variable delay circuit 18 is supplied to a D/A converter 19. The D/A converter 19 converts the digital luminance signal into an analog signal. An output signal of the D/A converter 19 is supplied to an output terminal 20.

In the camera signal input mode, the switch circuit 25 is placed in the terminal 25A position. Thus, the chroma signal received from the camera signal processing circuit 15 is supplied to a variable delay circuit 40 through the switch circuit 25. The variable delay circuit 40 is disposed in the camera signal processing circuit 15. An output signal of the variable delay circuit 40 is supplied to a D/A converter 41. The D/A converter 41 converts the digital chroma signal into an analog signal. An output signal of the D/A converter 41 is supplied to an output terminal 42.

Next, the VTR reproduction mode will be described. In the VTR reproduction mode, a reproduction video signal of which a luminance signal and a chroma signal including a cross-talk component are combined is supplied to the input terminal 1. The reproduction video signal is supplied to a sample hold circuit 2. In the VTR reproduction signal input mode (referred to as VTR input mode), the switch circuit 21 is placed in the terminal 21B position. Thus, an output signal of the sample hold circuit 2 is supplied to the A/D converter 14 through the switch circuit 21. The A/D converter 14 digitizes the signal received from the input terminal 1.

An output signal of the A/D converter 14 is supplied to the terminal 22B of the switch circuit 22. In the normal VTR reproduction mode, the switch circuit 22 is placed in the terminal 22B position. The switch circuit 23 is placed in the terminal 23A position. Thus, the output signal of the A/D converter 14 is supplied to the connection portion of the one-line delay circuit 16 and the one-line delay circuit 17 through the switch circuit 23.

An output signal of the switch circuit 23 and an output signal of the connection portion of the one-line delay circuit 16 and the one-line delay circuit 17 are supplied to a Y comb filter 3. An output signal of the switch circuit 23, an output signal of the connection portion of the one-line delay circuit 16 and the one-line delay circuit 17, and an output signal of the one-line delay circuit 17 are supplied to a C comb filter 4.

An output signal of the Y comb filter 3 is supplied to the terminal 24B of the switch circuit 24. In the normal VTR reproduction mode, the switch circuit 24 is placed in the terminal 24B position. Thus, the output signal of the Y comb filter 3 is supplied to the D/A converter 19 through the variable delay circuit 18. The output signal of the D/A converter 19 is supplied to the output terminal 20.

The output signal of the C comb filter 4 is supplied to the terminal 25B of the switch circuit 25. In the VTR reproduction mode, the switch circuit 25 is placed in the terminal 25B position. Thus, the output signal of the C comb filter 4 is supplied to the D/A converter 22 through the variable delay circuit 40. The output signal of the D/A converter 41 is supplied to the output terminal 42.

The output signal of the connection portion of the one-line delay circuit 16 and the one-line delay circuit 17 is supplied to the terminal 23B of the switch circuit 23. In the case that a drop-out takes place in the normal mode, the switch circuit 23 is placed in the terminal 23B position. Thus, the input signal is substituted with a signal prior to one line.

An output signal of a middle portion of the one-line delay circuit 16 (from a portion with a delay amount of 1 line–α) is supplied to the terminal 24C of the switch circuit 24. In the case that a drop-out takes place in the Hi 8 mode, the switch circuit 24 is placed in the terminal 24C position. Thus, the signal of the middle portion of the one-line delay circuit 16 is supplied to the D/A converter 19 through the switch circuit 24 and the variable delay circuit 18. The output signal of the D/A converter 19 is supplied to the output terminal 20.

In the VTR reproduction mode, the variable delay circuits 18 and 21 cause the delay of the luminance signal Y to accord with the delay of the chroma signal C. Thus, since the variable delay circuits 18 and 21, which are composed of digital circuits, are disposed downstream of the Y comb filter 3 and the C comb filter 4, the delay of the luminance signal Y can be easily matched with the delay of the chroma signal C.

Thus, according to the embodiment of the present invention, in the VTR reproduction mode, since a signal of which the luminance signal and the chroma signal that have been band-limited are combined is supplied, the process can be performed with only one A/D converter. In addition, since the A/D converter 14 and the 2H delay circuits 16 and 17 that process the camera signals can be used also in the VTR reproduction mode, it is almost not necessary to add new circuits.

The output signals of the Y comb filter 3 and the C comb filter 4 contain a component of the chroma signal and a component of the luminance signal, respectively. These residual components of the luminance signal and the chroma signal are removed by filters (not shown) disposed downstream of the filters 3 and 4. The filters that remove the residual components may be analog filters disposed downstream of the D/A converter or digital filters disposed upstream of the D/A converter.

In the above-described embodiment, in the normal mode, the drop-out is compensated only with the digital circuits. In the Hi 8 mode, the drop-out is compensated with an external analog circuit along with the digital circuits. In other words, in the mode of which the band of the luminance signal is wide such as the Hi 8 mode of an 8-mm VTR, if a signal of which the luminance signal and the chroma signal are combined is supplied to a comb filter, since the luminance signal interferes with the chroma signal, the image quality deteriorates. To prevent the interference, the band of the luminance signal Y should be limited before it is combined with the chroma signal. Thus, in the Hi 8 mode, signals are processed with only the Y comb type filer, not the C comb filter. Since an output signal is obtained from the middle portion of the one-line delay circuit 16 (the portion with a delay amount of one line–$\alpha$), the drop-out can be compensated with the digital circuits along with the external analog portion. The delay amount a is designated to a value of which the loop of the drop-out compensation has a delay of a total of one line due to the external analog portion other than the circuits between the sample hold circuit and the D/A converter. Since the component of the luminance signal corresponding to the band of the chroma signal is removed, the band of the drop-out signal becomes narrower than the band of the normal signal, no visual problem takes place.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A video signal processing apparatus, comprising:

input selecting means for selectively inputting a video signal, reproduced by video reproducing means, of which a component of a luminance signal and a component of a chroma signal are combined or an image signal photographed by image pick-up means;

A/D converter means for digitizing the selected signal selected by said input selecting means from the video signal of which the component of the luminance signal and the component of the chroma signal are combined or the image signal photographed by the image pick-up means;

a plurality of line delay elements connected in series and adapted for delaying an output signal of said A/D converter means, wherein a first line delay element of said line delay elements has a delay amount equal to one line of data minus $\alpha$, where $\alpha$ is substantially equal to a delay caused by an analog circuitry of said video reproducing means or of said image pick-up means;

luminance signal comb filter and chroma signal comb filter means for extracting the component of the luminance signal and the component of the chroma signal from said video signal selected by said input selecting means;

camera signal processing means for processing said image signal selected by said input selecting means;

selecting means, responsive to said input selecting means, for operatively coupling said video signal digitized by said A/D converter means to said line delay elements and said image signal digitized by said A/D converter means to said line delay elements;

wherein, said luminance signal comb filter and chroma signal comb filter means extracts the luminance and chroma components based on said video signal and delayed video signals delayed by said delay elements, and said camera signal processing means processes said image signal on the basis of said image signal and delayed image signals delayed by said delay elements; and output selecting means for selecting an output signal of said luminance signal comb filter and said chroma signal comb filter means or an output signal of said camera signal processing means.

2. The video signal processing circuit as set forth in claim 1, further comprising second selecting means for coupling a drop-out compensating signal from one of said line delay elements connected in series equal to a delay of one line to either said luminance comb filter and chroma comb filter means in replacement of said video signal or said camera signal processing means in replacement of said image signal.

3. The video signal processing circuit as set forth in claim 1, further comprising variable delay means disposed downstream of said luminance signal comb filter and said chroma signal comb filter.

4. The video signal processing circuit as set forth in claim 2, wherein said video signal is reproduced by a VTR from a recording medium.

5. A video signal processing apparatus, comprising:

an A/D converter circuit for selectively digitizing either a video signal reproduced by a video reproducing unit or an image signal photographed by an image pick-up unit;

a camera signal processing circuit for signal processing said image signal digitized by said A/D converter circuit to thereby generate luminance and chroma signals of said image signal;

a first delay circuit for providing a first delay that is equal to one line of data minus $\alpha$, wherein $\alpha$ is substantially equal to a delay caused by an analog circuitry of said video reproducing unit or of said image pick-up unit;

a second delay circuit in cascade with said first delay circuit for providing a second delay;

filter means for extracting luminance and chroma signals of said video signal;

mode selecting means for selecting either a camera signal input mode or a video signal reproduction mode;

wherein, when said mode selecting means selects said camera signal input mode, said A/D converter circuit digitizes said image signal, said camera signal processing circuit processes said image signal digitized by said A/D converter circuit, said first delay circuit delays by said first delay and said second delay circuit delays by said second delay said image signal processed by said camera signal processing circuit; and wherein, when said mode selecting means selects said video signal reproduction mode, said A/D converter circuit digitizes the reproduced video signal, said filter means extracts said luminance and chroma signals of the digitized video signal, said first delay circuit delays by said first delay said video signal digitized by said A/D converter circuit, and said second delay circuit delays by said second delay said video signal delayed by said first delay circuit.

6. The video signal processing apparatus as set forth in claim 5, wherein said camera signal processing circuit signal processes said image signal digitized by said A/D converter circuit on the basis of said image signal, said image signal delayed by said first delay circuit, and said image signal delayed by said second delay circuit; and wherein, said filter means extracts said luminance and chroma signals of said video signal digitized by said A/D converter circuit on the basis of said video signal, said video signal delayed by said first delay circuit, and said video signal delayed by said second delay circuit.

7. The video signal processing apparatus as set forth in claim 6, wherein said mode selecting means further selects a drop-out mode as a default to said video signal reproduction mode when said video signal drops out.

8. The video signal processing apparatus as set forth in claim 7, wherein when said video reproducing unit operates in a standard mode and said mode selecting means selects said dropout mode, said first delay circuit receives as an input signal said video signal delayed by said first delay circuit instead of said video signal digitized by said A/D converter circuit.

9. The video signal processing apparatus as set forth in claim 8, wherein said first and second delays each comprise a delay amount of one horizontal line.

10. The video signal processing apparatus as set forth in claim 5, wherein said first and second delays each comprise a delay amount of one horizontal line.

* * * * *